United States Patent [19]

Elter et al.

[11] Patent Number: 4,798,700

[45] Date of Patent: Jan. 17, 1989

[54] CERAMIC INSTALLATIONS

[75] Inventors: Claus Elter, Bad Duerkheim; Edgar Hornischer, Mannheim; Herrmann Schmitt, Winnweiler; Josef Schoening, Hambruecken, all of Fed. Rep. of Germany

[73] Assignee: Hochtemperatur-Reaktorbau GmbH, Fed. Rep. of Germany

[21] Appl. No.: 5,656

[22] Filed: Jan. 21, 1987

[30] Foreign Application Priority Data

Jan. 22, 1986 [DE] Fed. Rep. of Germany ....... 3601750

[51] Int. Cl.$^4$ .......................... G21C 7/08; G21C 7/22
[52] U.S. Cl. .................... 376/338; 376/381; 376/458
[58] Field of Search ............... 376/338, 381, 382, 458, 376/353, 459

[56] References Cited

U.S. PATENT DOCUMENTS

| 3,093,568 | 6/1963 | Cox | 376/459 |
|---|---|---|---|
| 3,228,852 | 1/1966 | Holmes et al. | 376/381 |
| 3,321,376 | 5/1967 | Machnig et al. | 376/381 |
| 4,199,405 | 4/1980 | Schweiger | 376/458 |
| 4,231,843 | 11/1980 | Myron et al. | 376/353 |
| 4,313,797 | 2/1982 | Affix | 376/353 |
| 4,314,883 | 2/1982 | Fritz et al. | 376/458 |
| 4,545,954 | 10/1985 | Ullrich et al. | 376/338 |
| 4,642,214 | 2/1987 | Zhong | 376/338 |
| 4,664,871 | 5/1987 | Schoening | 376/338 |

FOREIGN PATENT DOCUMENTS

| 3048602 | 7/1982 | Fed. Rep. of Germany | 376/458 |
|---|---|---|---|
| 1422471 | 11/1965 | France | 376/458 |

Primary Examiner—Harvey E. Behrend
Attorney, Agent, or Firm—Robert J. Koch

[57] ABSTRACT

A gas-cooled high temperature reactor is provided having a core filled with spherical fuel elements, in combination with a graphite side reflector including at least one nose-like projection protruding radially into the reactor core from said graphite said reflector, the at least one nose-like projection including at least one vertically disposed cavity adapted to receive discrete absorber material elements introduced into said reactor core as well as a vertically disposed continuous opening which permits communication between said cavity and the core of the reactor, said opening having a maximum width adjacent said cavity which is less than the minimum dimension of said discrete absorber material elements in order to prevent passage of said elements into said continuous opening from said cavity.

11 Claims, 1 Drawing Sheet

CERAMIC INSTALLATIONS

BACKGROUND OF THE PRESENT INVENTION

The invention relates to ceramic installations and more particularly to ceramic reflectors for use in nuclear reactors.

Ceramic installations are utilized in gas-cooled, high temperature reactors as side, bottom and roof reflectors intended to reduce losses caused by the migrating of neutrons. At least part of the neutrons moving to the outside are to be reflected back into the fission zone of the reactor, the so-called reactor core. The neutron flux increased at the edge of the fission zone by the reflector effect raises the output produced by unit mass of the fissionable material, leading to the improved utilization and more economical consumption of the nuclear fuel.

Highly purified graphite is used in gas-cooled, high temperature nuclear reactors as the material for ceramic installations. It is relatively inexpensive, has adequate strength and may be processed mechanically. It is refractory and has good thermal conductivity. A disadvantage is the change in its crystalline structure caused by neutron and gamma radiation and expressed by changes in mechanical strength and in volume.

Under the effect of temperature and high neutron fluxes, graphite expands at first negatively, but then positively beginning at a point of reversal, with increasing fluxes, which go beyond the original dimensions of the graphite body. The process is displaced with rising temperatures toward lower fluxes.

The differences in expansion within the structural part—in keeping with the flux distribution, at the onset of the irradiation the block layers close to the surface of the front facing the core tend to become shorter to a relatively greater extent due to shrinkage than the deeper layers—are the cause of the generation of residual stresses. To reduce these residual stresses, it is necessary to provide relief by expansion equalization. This may be obtained advantageously by slit surface structures which are equivalent to a dimensional reduction of parts of the graphite block.

In more recent developments of gas-cooled, high temperature nuclear reactors, in particular those of lower capacity (approximately 100 MWel) and with correspondingly smaller core diameters, in place of absorber rods inserted directly into the pile of spherical fuel elements, small absorber elements in the spherical form are provided for the shutdown of the reactor and are introduced into corresponding cavities of the reflectors.

In a manner similar to the AVR nuclear power plant in Julich, in the core of which nose-like projections with vertical cavities, the so-called nose stones, are provided to receive the control and shutdown rods, the newer gas-cooled high temperature nuclear reactors presently in the planning stage are equipped with nose stones of this type, but here they are intended for shutdown rods only. The nose stones are ashlar-shaped graphite blocks extending radially from the side reflector, to which they are physically joined, over the entire height of the reactor core into which they are projecting.

In view of the above-mentioned volume variations and the residual stress state caused by them in the irradiated graphite blocks, the surfaces facing the core of the latter are provided with vertical and horizontal surface slits, representing a resolution of the original large surface into small individual rills. To control stresses in the nose stones, the cavities provided for the introduction of the absorber elements are connected with the core by means of gaplike, vertically disposed continuous openings. These openings reduce the residual stresses in the nose stones to tolerable levels.

However, the afore-mentioned expansions lead in the course of the operation to a widening of the openings to such an extent that the separation of the absorber material and the fuel elements is no longer assured and the absorber elements are able to exit from the cavities and fuel elements can enter them.

Based on this state of the art, it is the object of the invention to provide measures for the design of ceramic installations which are simply and cost effectively realized and which prevent in a highly reliable manner the aforementioned deficiencies, in particular the passage of absorber and/or fuel elements through the continuous opening.

SUMMARY OF THE PRESENT INVENTION

In accordance with the present invention, the innermost gap width, i.e., the distance of the gap surfaces defining the gap from each other on the innermost side adjacent the cavity is determined such that it will correspond at most to one-half of the size of the minimum dimension of an absorber element present in the cavity. This insures that no absorber element can become jammed in or pass through the gap and hinder the deformation equalization for which the gap or continuous opening has been provided.

Simultaneously, this determination also takes into account the fact that the deformations caused by neutron irradiation are essentially confined to a zone close to the surface of the graphite nose stone facing the core, so that the width of the gap varies only slightly inside the cavity and that therefore said deformations are not hindered and additional stresses are avoided. In addition, the individual absorber elements are appreciably smaller than the fuel elements, so that by means of the spalt geometry described above, the passage of both the absorber elements and the fuel elements is safely prevented.

In a further embodiment of the invention the continuous opening is positioned on the front side of the nose stone and provided with an inserted graphite blocking member. This blocking member is guided positively in grooves molded opposingly into the surfaces of the opening. It is set loosely and transversely in the opening and assures the uniform absorption of neutron radiation by the absorber material inserted into the cavity, without preferential treatment being given to any spatial zone due to the absence of reflecting graphite.

Another embodiment of the invention takes this condition into account by the fact that the gap opening comprises a continuation of a slit-like groove on the face of the nose stone projecting into the core. Here again a direct impact on absorber material of neutron radiation is almost entirely excluded.

It has been found to be advantageous in this context to curve the opening away from the central portion of the core thereby obtaining a stronger reflection of the neutrons entering the gap and preventing the irradiation of the inner graphite areas.

Further advantageous embodiments of the invention concern the design of the gap geometry with parallel gap surfaces or with surfaces expanding from the inside out. The latter characteristic takes into consideration the aforementioned deformation, which appears primarily on the surface of the nose stone facing the core and which in the case of extended irradiation times, i.e., over the entire period of operation, is manifested by a volume increase.

DETAILED DESCRIPTION OF THE PRESENT INVENTION

The invention, together with advantageous examples of the embodiments and improvements, will become more apparent and are described in more detail below, with references to the figures in which two different embodiments are illustrated.

Figure 1:
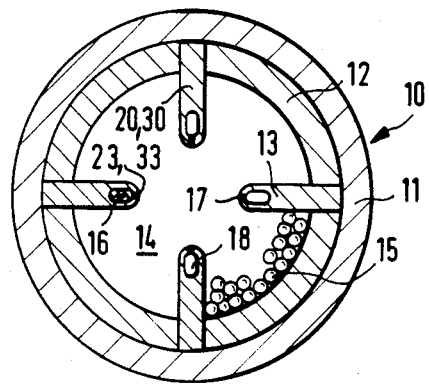
FIG. 1 shows a cross-section through a reactor core.

FIG. 1 shows a cross-section through a core 14, enclosed by circular cylindrical reactor pressure vessel 10, against the inner wall 11 whereof ceramic installations, in particular graphite blocks built up in the shape of a wall, are set as the side reflector 12, and into which four projections 13 are radially projecting in mutually opposing pairs.

The projections consist of individual nose stones 20, 30 set upon each other and positively joined to the side reflector 12. The nose stones 20, 30, which are made of graphite, as is the side reflector 12, comprise in their free frontal side 17 projecting into the core 14, a vertically arranged cavity with an elongated cross-section extending parallel to the external surfaces facing the core 14. In the area of its frontal side 17 a vertically oriented continuous gap or opening 23, 33 is formed in each nose stone 20, 30, said gap connecting the cavity 18 with the core 14. While the core is intended to receive the fuel elements 15, the vertical cavity 18 is to receive the absorber elements 16.

Figure 2:
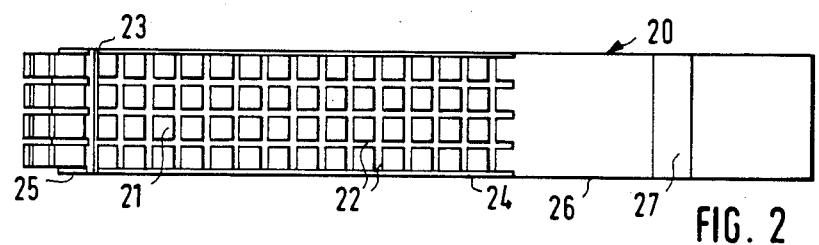
FIG. 2 shows a lateral elevation of a nose stone.

FIG. 2 shows an individual nose stone in a lateral or side elevation. The surface 21 of the nose stone 20 projecting into the core 14 is provided with a plurality of vertical grooves 22 close to the horizontal surface and laid out in a grid-like pattern, intended for the division of the external surfaced exposed to neutron radiation into small surface units to make possible the equalization of neutron-induced volume changes.

From the slit lateral surface 21 of the nose stone 20, into which the continuous gap 23 connecting the core 14 with the cavity 18 extends, the support surface 24 is offset by means of a step 25, whereby the nose stone 20 is joined both upward and downward with the next nose stone or the bottom or roof reflector respectively. The height of the step 25 corresponds to one-half the width of a surface gap 22, so that a gap 22 is again formed in case of nose stones set upon each other in the area of the adjacent surfaces 24.

The rear part of the nose stone 20, which is attached into the side reflector 12, comprises a groove 27 formed in the lateral surface 26 for anchoring purposes, with the side reflector 12 entering the said groove to form a positive joint. The surface 26, which is otherwise without gaps, joins the slit surface 21 in alignment.

With the exception of the lateral layout of the gap 23, which establishes the connection of the cavity 18 with the core 14, the lateral view of a nose stone 20 shown in FIG. 2 is identical with that of a nose stone 30 comprising a frontal gap opening. Therefore, no separate figure is shown to display this difference.

Figure 3:
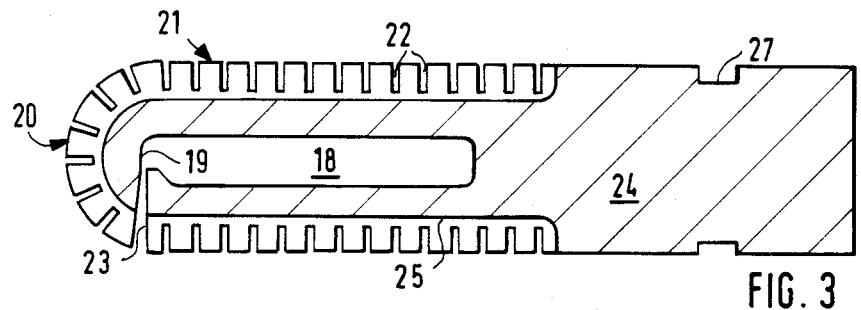
FIG. 3 shows a top view of a nose stone with a lateral gap.

FIG. 3 shows a nose stone 20 in a top view. In a supplementation of the view in FIG. 2, the configuration of the gap 22 close to the surface 21 facing the core 14 and of the support surface 24 offset by the center step 25 may be seen, together with the smooth surface 26 in the rear part of the nose stone 20, interrupted only by a groove 27 arranged vertically on each of the two sides. The groove 27 is rectangular, but according to the present invention a groove with a cylindrical profile may be provided in order to reduce stresses in the bottom of the groove, particularly in the corners.

The cavity 18 has a longitudinal cross-section and is connected at its narrow frontal side 19 through a gap 23 with the core 14. The gap 23 is thereby extended as a continuation of the narrow frontal side 19 of the cavity 18 through one of the two longitudinal sides of the nose stone 20 to the outside and expands at an angle from inside to the outside, with the gap surfaces being straight. However, according to the invention, the gap surfaces may also be curved away from the center portion of the core in an involute manner.

Figure 4:
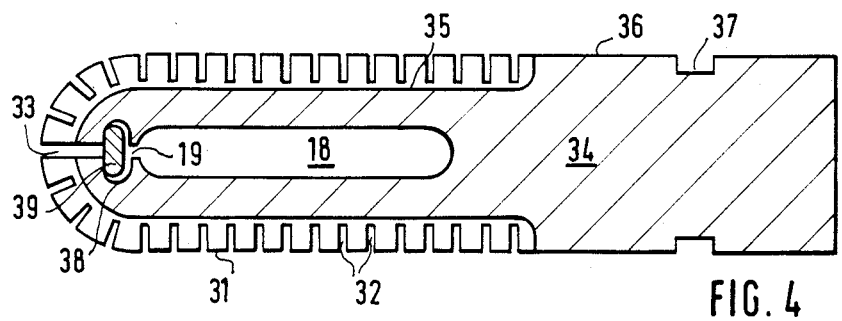
FIG. 4 shows a top view of a nose stone with a frontal gap.

FIG. 4 shows a top view of a nose stone 30 with a gap 33 on its frontal side, i.e., the gap 33 centrally passes through the narrow frontal side 19 of the elongated cavity 18. The nose stone 30 is thereby divided by the vertically continuous gap 33, the gap surfaces of which define the grooves 38 to receive a graphite blocking element 39, into two equal halves, which laterally surround the cavity 18 in the form of cheeks. The lateral surface 31 projecting into the core 14 is provided in the manner shown in FIG. 3 with slit-like recesses 32 close to the surface. The support surface 34 is similarly offset from the slit area by a step 35.

The rear area of the nose stone again has a smooth surface 36, into which on both sides a vertical groove 37 is set, said groove 37 being intended for anchoring in the side reflector 14.

What is claimed is:

1. In combination with a gas-cooled high temperature reactor having discrete absorber material elements for shutting down said reactor and a core filled with spherical fuel elements, a graphite side reflector comprising at least one nose-shaped projection protruding radially into the reactor core from said graphite side reflector, said at least one nose-shaped projection comprising:
(a) at least one vertically disposed cavity adapted to receive said discrete absorber material elements,
(b) a vertically disposed, continuous opening which forms a passageway for communication between said cavity and the core of the reactor, and (c) blocking means cooperatively engaged with said projection and positioned within said continuous opening for preventing direct communication between said cavity and the core of the reactor, said opening having a maximum width adjacent said cavity which is less than the minimum dimension of said discrete absorber elements in order to prevent passage of said elements into said continuous opening for said cavity.

2. The combination according to claim 1, wherein said blocking means comprises a graphite block cooperatively and freely engaged by correspondingly shaped portions of said projection and positioned transversely to said opening.

3. The combination according to claim 1, wherein said at least one nose-shaped projection comprises a plurality of graphite nose stones stacked one upon the other, said nose stones each including a vertically disposed continuous opening aligned with the vertically disposed continuous opening in adjacent nose stones.

4. The combination according to claim 1, comprising at least two nose-shaped projections uniformly positioned around the circumference of the reactor.

5. The combination according to claim 4, comprising four nose-shaped projections uniformly positioned around the circumference of the reactor in the form of opposing pairs aligned along a common axis.

6. The combination according to claim 1, wherein said vertically disposed , continuous opening extends from said cavity in said nose-shaped projection toward a center of said reactor core.

7. The combination according to claim 1, wherein said at least one nose-shaped projection comprises a plurality of grooves in the exterior surface thereof, wherein said continuous opening in the projection is a lateral extension of one of the exterior grooves toward said cavity.

8. The combination according to claim 1, wherein said continuous opening has a constant gap width.

9. The combination according to claim 1, wherein said continuous opening has a width which increases in dimension toward said core.

10. The combination according to claim 1, wherein said continuous opening has straight lateral surfaces.

11. The combination according to claim 1 wherein said continuous opening extends from said cavity in a direction away from the center portion of said core and comprises lateral curving surfaces.

* * * * *